United States Patent [19]

Kimball

[11] Patent Number: 4,679,810
[45] Date of Patent: Jul. 14, 1987

[54] POWERED STEP ASSEMBLY FOR VEHICLES

[76] Inventor: James F. Kimball, 83617 Rattlesnake Rd., Dexter, Oreg. 97431

[21] Appl. No.: 879,968

[22] Filed: Jun. 30, 1986

[51] Int. Cl.$^4$ ............................................. B60R 3/02
[52] U.S. Cl. .................................... 280/166; 182/91; 182/127; 297/434
[58] Field of Search ............... 182/91, 96, 97, 127; 297/434, DIG. 10; 280/163, 164 R, 166, 291

[56] References Cited

U.S. PATENT DOCUMENTS

| 368,896 | 8/1887 | Nicholas | 182/91 X |
| 3,961,809 | 6/1976 | Clugston | 280/166 |
| 4,110,673 | 8/1978 | Nagy et al. | 280/166 X |
| 4,116,457 | 9/1978 | Nerem et al. | 280/166 |
| 4,124,099 | 11/1978 | Dudynskyj | 280/166 X |
| 4,125,284 | 11/1978 | Hicks et al. | 280/164 R X |
| 4,415,202 | 11/1983 | Pew | 297/DIG. 10 X |

Primary Examiner—John J. Love
Assistant Examiner—Michael Mar
Attorney, Agent, or Firm—James D. Givnan, Jr.

[57] ABSTRACT

A three wheel vehicle having an operator seat at its forward end and a step assembly swingably mounted to the vehicle at a point forward of the seat. A control plate of the step assembly is swingably positioned by a powered actuating device. First and second steps are raised and lowered simultaneously by the control plate and in their lowermost position provide step access to the vehicle seat while in an elevated position provide a footrest for a seated operator. Pairs of links interconnect the steps. An additional pair of links connect the control plate to one of the steps. A pair of control bars are attached to and brace the forwardmost step and the vehicle body. A fully retracted position of the step assembly swings the control plate forwardly so that it may serve as a hitch component for coupling to a towing vehicle.

7 Claims, 3 Drawing Figures

POWERED STEP ASSEMBLY FOR VEHICLES

BACKGROUND OF THE INVENTION

The present invention concerns a step assembly positionable with respect to a supporting vehicle and capable of serving as a footrest.

In wide use today are three wheel, motorized vehicles for use primarily for off road use. Such vehicles include a steerable front wheel and powered rear wheels with the rider located intermediate the front and rear wheels in the nature of a tricycle.

A vehicle with a directly accessible seat at the forward end of the vehicle while highly desirable, particularly for middle aged and older users, was not heretofore feasible in view of problems associated with vehicle ingress and egress. Accordingly, the recreational use of motorized three wheel vehicles has been previously limited, for the most part, to the younger set.

The present step assembly enables access to a vehicle seat located at the forward end of the vehicle.

SUMMARY OF THE PRESENT INVENTION

The present invention is embodied within a step assembly for use during vehicle ingress and egress.

The present step assembly is advantageously used on a vehicle to provide convenient access to a vehicle seat and thereafter serves as a footrest and protective barrier during vehicle use.

A control plate of the step assembly is hingedly mounted on the vehicle and is swingably positioned by a powered actuator. The control plate is coupled to and imparts movement to multiple step components of the step assembly positioning same initially into ground contact during vehicle boarding and thereafter elevating same to serve as a footrest.

Still further positioning of step assembly components permits the step assembly to function as a hitch for highway towing of the step assembly equipped vehicle.

The present step assembly permits direct access to a vehicle seat and thereafter, upon elevation, the step assembly projects forwardly to provide both a footrest and protective barrier for the vehicle operator. Step members provide multiple footrest areas to accommodate operators of different size.

Important objectives include the provision of a step assembly providing vehicle ingress and egress; the provision of a step assembly that may serve as a footrest for vehicle occupant; the provision of a step assembly that has an elevated position which enables the assembly to function as a hitch for attachment to a tow vehicle for towing of the step equipped vehicle; the provision of a step assembly that may be powered by a compact linear actuating device powered by a vehicle carried power source.

DETAILED DESCRIPTION OF THE PREFERRED EMBODIMENTS

Figure 1:
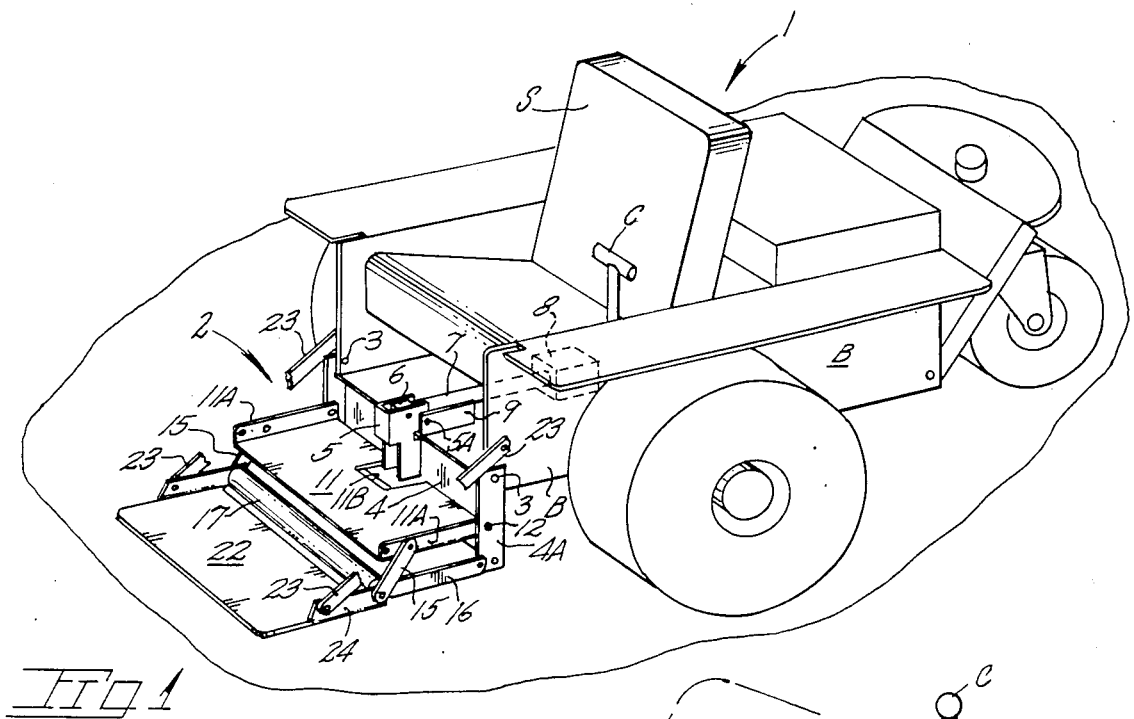
FIG. 1 is a perspective view of the present step assembly and its supporting vehicle.

With continuing attention to the drawings wherein applied reference numerals indicate parts similarly hereinafter identified, the reference numeral 1 indicates generally a vehicle on which the present step assembly, generally at 2, may be mounted. A vehicle seat S is forwardly located on the vehicle. A control at C provides speed and directional control.

Step assembly 2 is shown mounted to the front end of the vehicle body at B by means of a pair of pivotal connections at 3 having a horizontal axis and from which swingably depends a control plate 4 of the assembly.

A clevis 5 on the control plate receives a rod end 6 at the end of a rod 7 of a vehicle mounted linear actuating mechanism 8. A bracket 9 supports a clevis pivot at 5A. Axial movement of rod 7 accordingly imparts swinging movement to and positions control plate 4. Actuating mechanism 8 includes a reversible electric motor in circuit with a battery power source on the vehicle via a suitable operator controlled multiposition switch not shown. One suitable linear actuating mechanism is one manufactured and sold by the Warner Corporation.

Step means of the assembly includes a first step 11 with flanges 11A pivotally mounted at 12 to control plate side flanges at 4A. In its loading or boarding position in FIG. 1, step 11 is horizontally positioned above the ground. Linkage acting on step 11 during step positioning includes pairs of links 15—15 and 16—16. Links 15—15 depend from step 11 and terminate outwardly in pivotal attachment to spindles at 17A the ends of an elongate ground engaging roller member 17. The second pair of links 16—16, extend from the lower end of control plate 4 and also terminate in pivotal attachment to roller spindles 17A. Step 11 has a cut-out area at 11B to provide clearance with clevis 5 during elevation of step 11 as later described.

The roller spindles 17A additionally pass through side flanges 24 of a second step 22 which has a loading position as shown in FIG. 1 i.e., superimposed on a ground surface.

Figure 2:
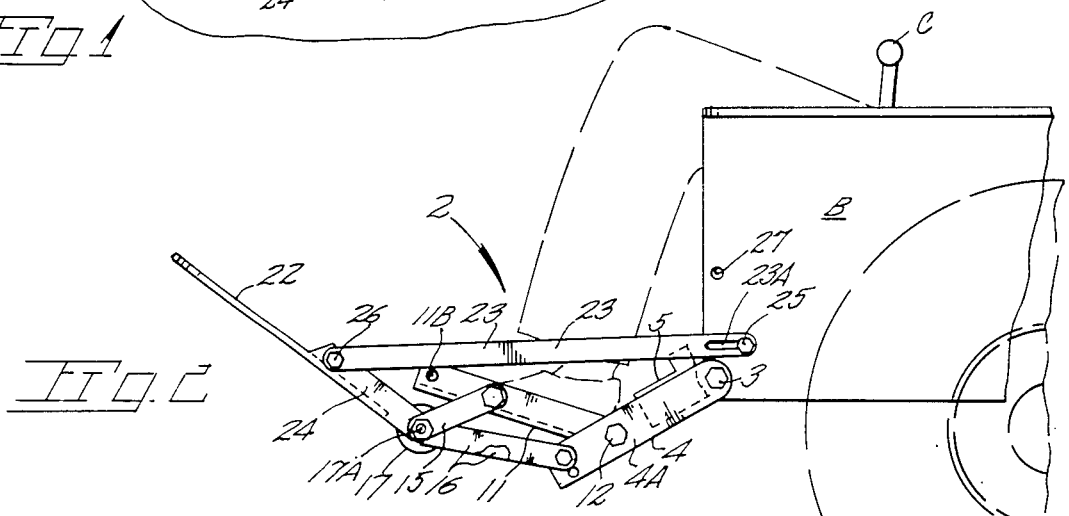
FIG. 2 is a side elevational view of the step assembly elevated to a travel position with a fragment of the vehicle shown.

Step control bars at 23 are pivotally connected at 25 to the sides of the front of the vehicle body and are likewise pivotally connected at 26 to step flanges 24. The control bars constrain step 22 for travel along an upright course with proper positioning of second step 22 to the raised, inclined position (FIG. 2) permitting the step to serve as a footrest when the vehicle is underway. Step 11 may likewise function as a footrest for an operator of shorter stature.

The step control bars 23, in addition to serving as braces for second step 22, serve to resist impact loads imparted to the step 22 upon accidental contact with an object during vehicle travel.

Figure 3:
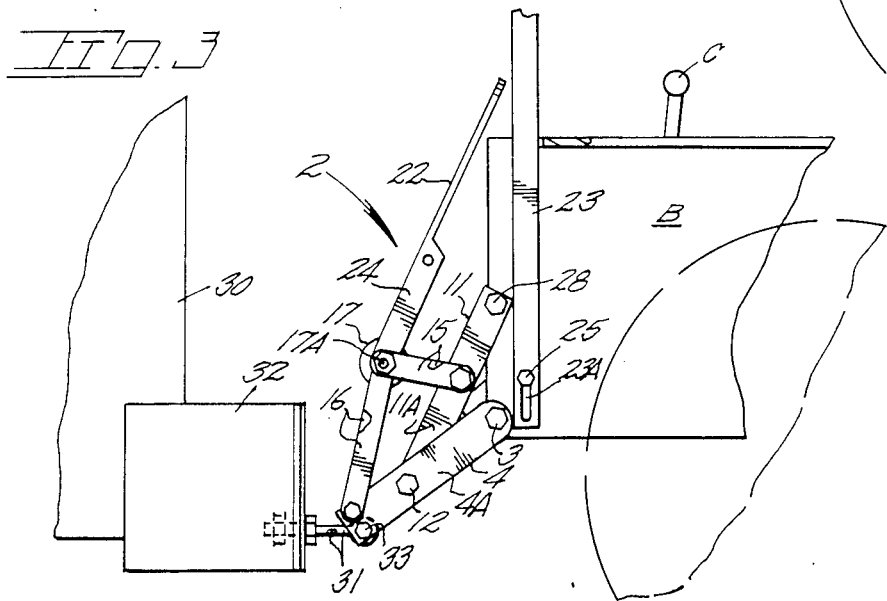
FIG. 3 is a view similar to FIG. 2, but with the step assembly fully elevated to enable attachment of the step assembly equipped vehicle to a towing vehicle.

Retraction of the step assembly, as shown in FIG. 3, enables attachment of the step equipped vehicle to a towing vehicle at 30. Control bars 23 are uncoupled from the second step and then positioned upwardly and rearwardly for towing. The control bars 23 are stowed in an upright position along the sides of the vehicle body. Elongate openings as at 23A in each bar permits the bar to be axially shifted for ease of uncoupling.

First step 11 is secured in a fully retracted position by means of openings 11B in its flanges 11A which openings receive bolts 28 which also pass through openings 27 in the forward end of the vehicle body. Such securement of the first step to the vehicle body, in addition to holding the step assembly retracted, provides additional attachment points of the step assembly to the vehicle body to strengthen step assembly attachment to towing vehicle 30 when the step assembly is serving as a hitch component as in FIG. 3. Hitch members at 31 are shown as eye bolts at 31 and receive fasteners 33 to couple the control plate 4 to the bumper 32 of towing vehicle 30.

While I have shown but one embodiment of the invention, it will be apparent to those skilled in the art that the invention may be embodied still otherwise without departing from the spirit and scope of the invention.

Having thus described the invention, what is claimed and desired to be secured in a Letters Patent is:

1. A step assembly for a vehicle having a forwardly disposed seat, said assembly comprising,
   a control plate pivotally attached to said vehicle for movement about a horizontal axis,
   step means pivotally secured to said control plate and located forwardly of said vehicle seat and including a step member,
   linkage means pivotally coupling said control plate to said step means,
   control bars releasably attached at one of their ends to said step means and at their opposite ends to the body of said vehicle, and
   powered actuator means carried by said vehicle and coupled to said control plate for positioning said plate about said horizontal axis, wherein control plate movement by said actuator means will position said step means between a lowermost, generally horizontal ground engaging position to function as a step and an inclined elevated position for permitting said step means to function as a footrest for an occupant in said vehicle seat, and wherein said step means may be pivoted from said inclined elevated position to a generally vertical, fully elevated position after said control bars have been disconnected from said step means.

2. The step assembly claimed in claim 1 wherein said step means additionally includes a second step member, said linkage means including links coupling said second step member to the first mentioned step member.

3. The step assembly claimed in claim 2 wherein said control bars pivotally attach said second step member to the vehicle for supporting said second step member in said inclined elevated position.

4. The step assembly claimed in claim 1 wherein said control plate is adapted to receive hitch members carried by a tow vehicle for towing of the step assembly equipped vehicle.

5. The step assembly claimed in claim 1 additionally including an elongate ground engaging member carried by said linkage.

6. The step assembly claimed in claim 1 wherein said actuator means is an electrically powered linear actuating mechanism.

7. The step assembly claimed in claim 1 wherein said step means defines apertures for reception of fastener means securing said step means to the vehicle body when the step assembly is in said fully elevated position.

* * * * *